Feb. 13, 1968 R. L. VOLLER 3,368,692
PLEATED POCKET FORMING METHOD
Filed Jan. 20, 1964 2 Sheets-Sheet 1
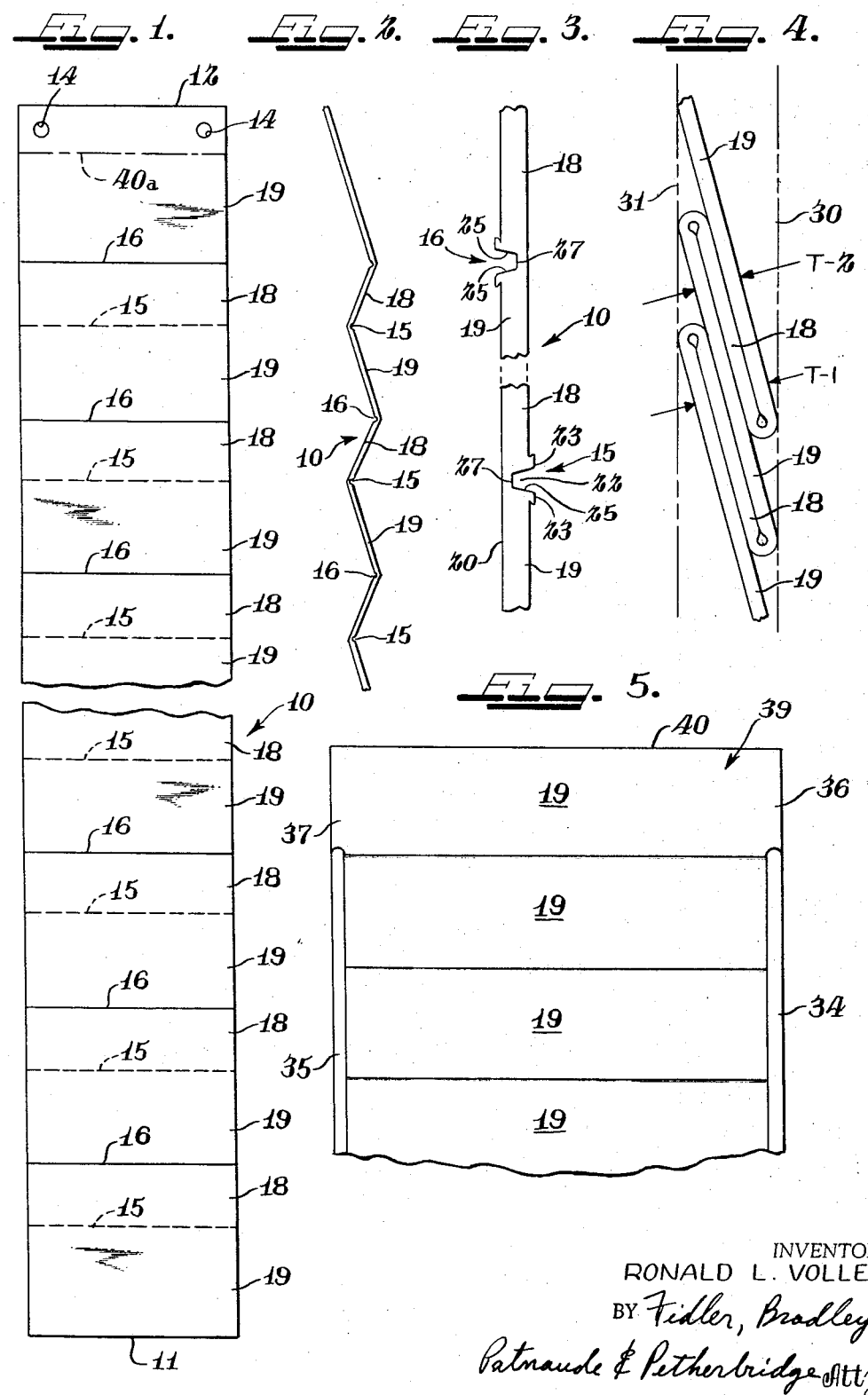
INVENTOR.
RONALD L. VOLLER
BY Fidler, Bradley,
Patnaude & Petherbridge Attys.

Feb. 13, 1968   R. L. VOLLER   3,368,692
PLEATED POCKET FORMING METHOD
Filed Jan. 20, 1964   2 Sheets-Sheet 2
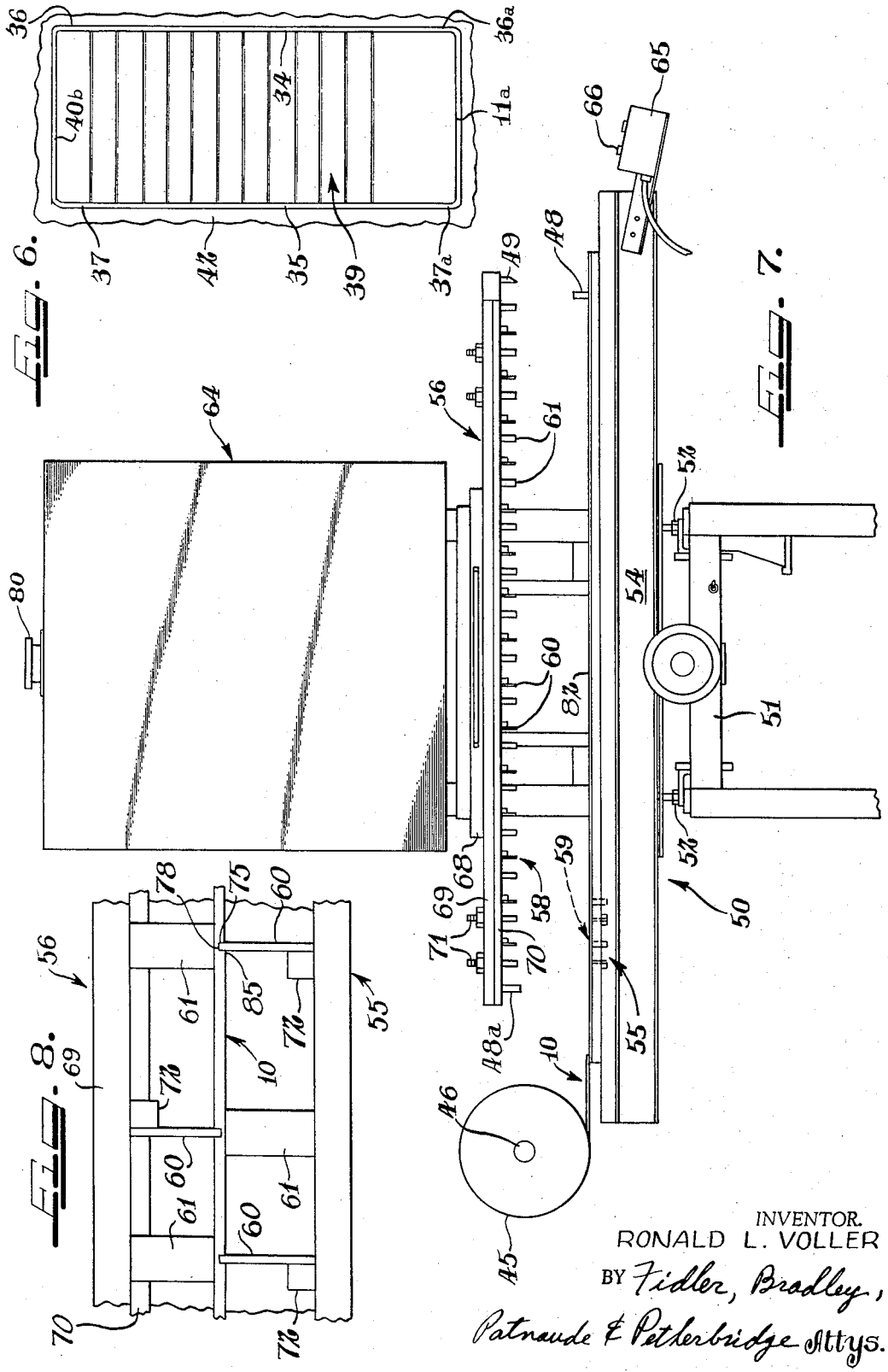
INVENTOR.
RONALD L. VOLLER
BY Fidler, Bradley,
Patnaude & Petherbridge Attys.

United States Patent Office 3,368,692
Patented Feb. 13, 1968

3,368,692
PLEATED POCKET FORMING METHOD
Ronald L. Voller, Niles, Ill., assignor, by mesne assignments, to Coniker Enterprises, Inc., Chicago, Ill., a corporation of Delaware
Filed Jan. 20, 1964, Ser. No. 338,777
23 Claims. (Cl. 211—87)

ABSTRACT OF THE DISCLOSURE

An apparatus and method for producing a scoring groove in a plastic sheet in a manner such that a compression extrusion is produced adjacent the border of the groove and the walls of the scoring groove are stressed to cause the opposed sides of the groove to draw together and to bend the surfaces of the sheet bordering the groove towards each other. The apparatus and method further involve the production of a plastic sheet which is scored alternately on opposite sides and is assembled and sealed to provide a staggered pleated pocket device.

This invention relates to methods and means for forming pleats in plastic materials, and is more particularly directed to new and improved methods and apparatus for automatically and simultaneously electro-mechanically placing pocket defining shaped scores in a strip of heat sealable plastic material whereby to facilitate either manual or automatic folding of same in a series of pleated pockets. The pockets are heat sealed and may be used in several ways; such as per se or by being heat sealed to a web or sheet of heat sealable material which may be a flap or leaf of a binder, notebook, portfolio or the like.

Heretofore, difficulty has been encountered in the design and manufacture of such pleated pocket arrangements which form a part of a notebook, binder, portfolio or the like, to hold papers. The prior art methods of forming such pleated pockets included steam pressing of a strip of plastic material to form a plurality of pleats and heat sealing of the folds of plastic material individually along the edges of each of the folds to form pleats. The now pleated plastic material was then sealed along its edges to a backing or web, for example, a flap or leaf of a binder or notebook, to complete formation of the pleated pocket arrangement. It will be appreciated that such prior art hand forming methods were time-consuming, expensive, and resulted in an increase in the cost of the resultant binder pleated pocket. Moreover, the hand sealing methods of the prior art did not assure an adequate heat seal of each of the pleats, and, in use, the several individual pleated pockets were not uniform, and especially susceptible to tearing and damage at the weaker pockets.

With the present invention, the aforementioned problems and difficulties of the prior art, among others, are substantially overcome by the provision of a new and improved high-speed method and apparatus for automatically and electrically forming simultaneously a plurality of grooves for defining folds of a sheet of plastic material to form a plurality of pleats for simultaneous heat sealing for use in pleated pockets employed in binders, portfolios, notebooks and the like.

The present method can make use of many of several plastic materials having the attribute known as a memory characteristic which causes molecules, when disarranged, to tend to return to status quo. With the present method, the material is permanently grooved in a new manner in new apparatus in a way whereby the memory characteristic will cause the material to tend to move toward overlying pleated folds when removed from the apparatus. Thereafter the ends of the material are moved toward each other to complete the pleating step; and the sides, at least, of the pleated folds are sealed to one another to form a plurality of pleated pockets in one sealing step. The pleated pockets thus formed can be assembled with many different articles having heat sealable webs to hold papers, cards, and the like.

It is, therefore, an object of the present invention to provide new and improved methods for forming pleated pockets for binders, portfolios, notebooks and the like.

It is another object of the present invention to provide new and improved methods for forming pleated plastic sheet material for use in binders and the like.

Still another object of the present invention is to provide new and improved methods for electrically heat forming plastic material to cause same to form pleated pockets for binders and the like.

A further object of the present invention is to provide new and improved methods for simultaneously heat sealing pleats formed in a sheet of plastic material and either simultaneously or consecutively heat sealing the thus formed pleated and sealed plastic material to a flap or folder of a binder or the like.

Another object of the present invention is to provide new and improved apparatus for forming pleated pockets of use in binders and the like.

Still another object of the present invention is to provide new and improved apparatus for defining folds of a sheet of plastic material by utilizing heat.

A further object of the present invention is to provide new and improved apparatus for electrically heat defining simultaneously a plurality of folds in a sheet or strip of plastic material.

These and other objects, features and advantages of the present invention, will become readily apparent from careful consideration of the following detailed description and claims, when considered in conjunction with the accompanying drawings, wherein like reference numerals and characters refer to like and corresponding parts throughout the several views and, wherein:

FIGURE 1 is a plan view of a strip of plastic material found useful in the practice of the present invention;

FIG. 2 is a right side projected view of the upper portion of FIG. 1 showing the configuration of the material after removal from the scoring apparatus of the invention;

FIG. 3 is an enlarged fragmentary side view showing transverse scores in the material;

FIG. 4 is an enlarged side view of the material folded into pleats with the thickness of the material exaggerated;

FIG. 5 is a front view of a top portion of a pleated pocket;

FIG. 6 is a front view of a pleated pocket attached to a web;

FIG. 7 is a front view in elevation of die apparatus for defining folds in the strip material of FIG. 1; and FIG. 8 is an enlarged fragmentary sectional view of one die set used in the apparatus of FIG. 7.

Referring now in detail to the drawings and first to FIG. 1, a strip of material 10 may be supplied in the form of a roll for example, as indicated in FIG. 7. Of course, for certain adaptations of the invention, the strips may be pre-cut and supplied to the apparatus to be described in detail below individually. However, for high-speed production of pleated pockets of substantially uniform dimensions, it is preferred that the strip material be supplied to the apparatus by a step feeding process to be described more in detail hereinafter.

The strip 10 is shown as sheared off at its bottom edge 11 and is provided adjacent the top edge 12 with a pair of holes 14 spaced adjacent the corners of the top 12 of the strip 10. The holes 14 may be punched in the material in a molding operation and may either serve to mount a strip when the pleated pockets are formed such as by being hung on a wall by suitable pins (not shown) cooperable with the holes 14.

The strip 10 may be fabricated from any of a number of heat-sealable plastic materials. One presently preferred material is polyvinyl chloride polymer which has a favorable memory characteristic. This characteristic is particularly useful in forming pleated pockets because the finished product has a tendency to spread slightly at the folded edges so that pockets are readily accessible for insertion of papers and/or cards, or the like. In one particular adaptation of the invention, the front surface shown exposed in FIG. 1 of the strip of material 10 is suitably textured to reduce the adherence characteristic of adjacent surfaces one with the other in the finished pleated pocket.

The strip of material 10 has a series of lower, or underneath scores 15, and a series of top scores 16 which are formed with a particular tool and in a particular shape to be described more fully below.

Referring now to FIG. 2, the appearance of the top portion of the strip of material 10 has its front face on the left side of this figure and is a projection from FIG. 1. The scores 15 on the right-hand or bottom side of the strip 10 causes the strip when tension is removed from the same to angle in the direction indicated so that each of legs 18 and 19 form an angle between each other to an extent determined by the displacement of plastic material in the scores 15. The scores 16 on the face of strip material 10 act in substantially the same manner to form an angle in the opposite direction between adjacent legs 18 and 19 of the strip 10.

Referring now to FIG. 3, a substantially enlarged side elevation of the strip of material 10 is shown. The scores 15 and 16 are substantially identical and accordingly only the score 15 lying between legs 18 and 19 of the strip of material 10 will be explained in detail.

By way of example only, the strip of material 10 may be approximately eight-thousandths of an inch thick. It is to be understood, of course, that materials of different thicknesses can be used and in certain applications thinner or thicker material than this dimension may be most desirable. The score 15 is impressed between a relatively flat surfaced tool that engages an area 20 on the top surface of the strip of material 10 and a relatively narrow-nosed tool, to be described in detail below forms a groove 22 approximately to one-third of the thickness of the material 10, in this instance about three-thousandths of an inch penetration. The tool to be described below is arranged to be electrically excited and heated while penetrating a material to cause compression flow of same outwardly and upwardly to form parallel humps 23 extending across the strip of material 10.

While not to be construed in a limiting sense, because different materials will require different degrees of excitation, it has been found this eight gauge material application of eight kilowatts for approximately one and one-half seconds and alternating same at approximately twenty-five megacycles radio frequency at a die temperature of about 200 degrees F., that the molecular domains within the material 10 will be excited and heated and caused to flow to favorably form the humps 23 and stress the domains on the sides 25 of the grooves 15 and 16. A substantial tendency to recover due to memory of the material will cause a stress to be placed in the surfaces of the sides 25 whereby the same will assume approximately a configuration like that shown in FIG. 2.

Because the thickness of the material in strip 10 at areas 27 in the several scores 15 and 16 is reduced to about three-thousandths of an inch, the mechanical strength of the strip is likewise reduced along these scores and, accordingly, the following steps of folding and forming the pleated pockets are made ready and facile.

Referring again to FIG. 1, the extended strip 10 may have substantial length, for example, the apparatus to be described below can score strip material having a length of 55 inches. Accordingly, the locating holes 14 can be utilized in an assembly jig at one end of the scored strip of material 10. Either an automatic device may engage the end 11 of the strip or same can be manually moved to urge same upwardly (as viewed in FIG. 1) to cause the several legs 18 and 19 to form into close pleats which may be substantially upstanding out of the plane of the paper of FIG. 1 to greater or lesser degree.

With the end 11 moved up into suitable position with relationship to the locating holes 14 or the end 12, suitable force and direction of motion can be applied, for example along surfaces 30 and 31, FIG. 4, with the surface 30 being moved downwardly with respect to surface 31, or vice versa, which will rotate the several legs 18 and 19 simultaneously in substantially a clockwise direction until the legs lie substantially flat and parallel to the scores 15 and 16 to form a pocket module 39. FIG. 5. With the pockets thus assembled, the maximum thickness of material T-1 will be approximately forty-thousandths of an inch, and the thickness T-2 requiring at least a minimum of heat sealing will be approximately twenty-four thousandths of an inch. In order to heat seal edges 34 and 35, FIG. 5, at least through the area having the thickness T-2, an adjacency of heated dies must be obtained less than substantially twenty-thousandths of an inch. With such motion of edge heat sealing dies, the areas 36 and 37 adjacent the sealed edges 34 and 35 would be unsealed. The top of the strip may, prior to this stage, have been trimmed on an edge 40 indicated by a dot-dash line 40a, FIG. 1 to complete a pleated multiple pocket assembly without the holes 14, as desired.

As mentioned briefly above, one of the wide uses of such pleated pockets is in connection with flaps or leaves of notebooks or portfolios, or the like, for receiving cards and papers in readily classified positions or in open view as in an index card system, for example. Accordingly, the pleated pocket assembly of FIG. 5 may be further heat-sealed as shown in FIG. 6 on a sheet of material 42 by continuing the edge seals 34 and 35 into areas 36, 37, 36a and 37a, and at top and bottom edges 11a and 40b of the pleated pocket assembly 39.

APPARATUS

A machine for fabricating the scores 15 and 16 whereby to facilitate formation of pleated pocket assemblies 39 is shown diagrammatically in front elevation in FIG. 7. A strip of material 10 is shown being supplied from a roll 45 mounted on a suitable journal 46. The strip of material is adapted to extend from the roll 10 at least to a laterally spaced pair of locating pins 48, only one of which is shown, that cooperate with locating holes 14, FIG. 1, in the strip of material 10. A suitable shear or scoring blade 49 is preferably provided also to cut off a preceding formed strip 10 during the formation of a succeeding strip 10.

The score-forming machine 50 is mounted on a base 51 and has suitable leveling adjustments 52 connecting the base 51 to supports 54, only one of which is shown, for a bottom platen 55. The bottom platen 55 is substantially identical in most details, to a top platen 56 which has a series of groove-forming die bars 58 cooperable with similar die bars 59, only a few of which are shown in dotted line. The die bars 58 and 59 each comprise a spaced series of groove-forming die blades 60 each cooperable with alternately spaced backing plate die members 61. The bottom platen 55 is stationary and the top platen 56 is reciprocated in well-known manner by a suitable reciprocating apparatus contained within a housing 64. The reciprocating apparatus is placed into a programmed operation by a programming switch 65 mounted on the right-hand side of the support members 54 and is controlled in a sequentially single program by a switch 66, for example, each time the switch 66 is actuated.

In operation, a strip of material is moved to a position determined by the locating pins 48 cooperable with the holes 14 in the strip of material 10. The button 66 is depressed and the top platen 56 is moved down to a predetermined distance to cause the die parts 60 and 61 to form upper and lower transverse scores in the strips of material 10. The dies 58 and 59 are provided with punches 48a, only one of which is shown, to pierce a next set of holes 14.

After a predetermined time of heating and excitation of the molecular domains in the material adjacent the dies 60 and 61, the upper platen 56 is raised substantially to positions shown in FIG. 7 and the strip of material between the dies 60 and 61 removed and a new length of the strip material 10 with locating holes 14 already therein moved to a position for a subsequent identical operation. The time of this operation for eight gauge material is approximately one and one-half seconds.

The dies 60 and 61, as well as the blade 49, of the upper platen 56, are heated preferably by an electric heater 68 which heats a backing plate 69 for a heat conducting plate 70 mounting the dies 60 and 61. The lower platen 55 is also heated in substantially an identical manner. The platen parts are preferably of aluminum, the dies 60 of brass and the dies 61 of aluminum, in this example.

Sufficient heat, controlled by thermostatic devices not shown, is supplied to the dies 60 and 61 to maintain a temperature at the scoring surfaces thereof of about 200 degrees F. Because of the bi-metallic character of this construction, as well as because of the length of the dies over which pressure is applied by the reciprocating mechanism in the housing 64 raising and lowering the upper platen 56, adjustment set screws 71 are provided. With the exemplary material used, the platen 56 is bowed down about one-eighth of an inch at each end with respect to the ends of the backing plate 69.

With reference to FIG. 8, the details of construction of one presently preferred die set is shown. The lower platen 55 is formed of an aluminum plate suitably and conductively secured on the support members 54. The aluminum die plate 61 is shown in engagement with the bottom of the strip of material 10. The upper platen 56 is also an aluminum plate 70 and is shown in this partial section as having two backing die members 61. The brass groove-forming members 60 are all identical and only one will be explained in detail. The members 60 are mounted for electrical conductivity by support bars 72 secured to the upper plate 56 to provide a predetermined wattage to each of the ends 75 of the dies 60 which extend completely across the strip of material 10.

As set forth in this example, there is a three-thousandths of an inch gap 78 through the strip of material 10 between each of the die members 60 and 61. The die members and platens 55 and 56 are stopped in relationship to each other by a mechanical limiting device controlled by knob 80. At this point of engagement, the dies 60 and 61 are about three-thousandths of an inch apart. The shear blade 49 is adjusted so as not to short circuit the platens 55 and 56, but approaches the lower platen to about one-thousandth of an inch, or less, and leaves a tear line at edges 11 and 12, FIG. 1.

With the die members 60 and 61 adjusted, a three-thousandths inch gap 78 exists between opposite ends of the dies 60 and 61. Accordingly, there is about five-thousandths of an inch penetration of the dies 60 into the upper and lower surfaces of the strip of material 10, which in the example used is eight-thousandths of an inch thick.

When switch 66 is depressed, the dies 60 and 61 will close and the radio frequency cycle will automatically start. The radio frequency current will excite electromagnetic domains in the material between the dies 60 and 61 in an area of flux gap between the reversible polarity poles thereof. It appears that the excitation concentrates and compresses the molecules because the cross-sectional area of the raised beads 23, FIG. 3, does not equal the cross-sectional area of the score valleys 22. Heat concentration appears to be approximately uniform through the thickness of the material; and not a gradient (hot surfaces and cool center material) such as is common with presently practiced heat forming methods and apparatus. Subsequent cooling of the deformed surface thus contracts the material to create the side configuration illustrated in FIG. 2.

While I have shown and described in detail one presently preferred method and a preferred apparatus for accomplishing the method for forming multiple substantially uniform pleated pockets, obviously non-uniform pleated pockets and other useful configurations could be formed by the same or similar process and, accordingly, I wish to be limited in my invention only by the scope of the following claims.

I claim:

1. A method of forming at least one fold in a plastic sheet material subject to molecular excitation by a magnetic flux comprising the steps of subjecting the sheet to a magnetic flux to excite the molecules in a predetermined area of the sheet, applying to the sheet a means for producing at least one scoring groove in the sheet while the sheet is under the influence of the magnetic flux, producing a compression extrusion of the material of the sheet from the scoring groove to a point adjacent the scoring groove, removing the flux and the means for producing the scoring groove to produce a stress in the side walls defining the scoring grooves and to cause the opposed sides of the scoring groove to draw together and to bend the surfaces of the sheet bordering the groove towards each other.

2. A method as set forth in claim 1, wherein the magnetic flux is established by alternating electric power.

3. The method of claim 2, wherein the alternating electric power is an alternating high frequency power.

4. The method of claim 3, wherein the power applied is about one kilowatt per thousandths of an inch thickness of the sheet material.

5. The method of claim 3, wherein the power is applied at radio frequency.

6. The method of claim 5, wherein the operating radio frequency is at least about 20 kilocycles.

7. A method as set forth in claim 1, wherein heat is supplied during the exciting step to further facilitate scoring of the material.

8. A method as set forth in claim 1, wherein a plurality of said lines are formed alternately on opposite surfaces of the materials to facilitate forming of a plurality of pleats.

9. A method as set forth in claim 8, wherein the lines are straight.

10. A method as set forth in claim 7, wherein the lines are spaced greater and lesser distances to provide pockets with exposed top surfaces.

11. A method as set forth in claim 10, including the step of heat sealing at least one edge of the fold at an angle with respect to the line.

12. A method as set forth in claim 9, including the step of heat sealing the folded material to a backing sheet of material along at least said edge.

13. The method of claim 3, wherein the scoring groove of applying means is a mechanical means for penetrating the surface of the sheet.

14. The method of claim 13, wherein the sheet is penetrated at least to a depth of one-half the thickness of the sheet.

15. The method of claim 14, wherein the mechanical penetrating means is heated to a predetermined temperature.

16. A method as set forth in claim 1, including the step of heat sealing at least one edge of the fold at an angle with respect to the line.

17. A method as set forth in claim 16, including the step of heat sealing the folded material to a backing sheet of material along at least said edge.

18. A method of forming heat-sealable strips of plastic material having a memory characteristic into a plurality of pleated pockets comprising the steps of, forming transverse two-sided scores alternatively in opposite sides of the strips of material in a manner to stress the area of material in the sides of the scores, contracting the material in the strip between the ends thereof in a manner to permit the stressed areas of material to direct adjacent legs of material into pleats, and sealing at least portions of the edges of the pleats to form a series of pockets defined by the pleats and the sealed edges.

19. A heat seal formed pocket device comprising an elongated and foldable sheet of heat-sealable material, the sheet being provided with a plurality of spaced transverse score lines, each of said score lines being electro-mechanically produced and of a thickness less than the thickness of the remainder of the sheet, the sheet being folded transversely back upon itself along the score lines to provide a plurality of pockets, and the transverse edges of the sheet portions forming the pockets being sealed to close the opposite sides of each pocket.

20. The device of claim 19, wherein each of said score lines is a groove in said sheet.

21. The device of claim 20 wherein each groove is formed in the surface of said sheet opposite the surface of the sheet in which an adjacent groove is formed.

22. The device of claim 19 wherein the pocket device has a transverse rear wall connected across a scored portion to a transverse front wall, the rear and front walls of each of the pockets being heat sealed at opposite transverse ends thereof to define an open end for insertion of an article into the pocket, the rear and front walls being spaced for receiving the article, the sheet being folded in a manner such that each pocket is spaced from the corresponding open end of every other pocket, the folded material being heat sealed to said cover portion.

23. The device of claim 2, wherein alternate scores of the transverse axially spaced scores on the foldable sheet of heat-sealable material are located on opposite sides of the sheet, the opposed surfaces defining the scores being disposed at an acute angle with respect to the longitudinal axis of the sheet, each of the outermost edges of these score defining surfaces being formed with a hump extending outwardly from the sheet and in the general direction of the adjacent score defining surface thereof, the humps being aligned in generally transverse parallel alignment, the angle of the score surfaces and the existance of the humps adjacent thereto serving to stress the sheet in the scored area and to produce a slight bend therein in the direction of folding, alternate scores producing stress bends in opposite directions along the axis of the sheet, the sheet being folded back upon itself along the scores in alternate directions a plurality of times to provide a plurality of pockets, the pockets having transverse scored top walls with the scores being on the unexposed surface of the top walls, the top wall joining a front wall on one edge and a backwall on another edge, the back and front walls of each pocket being joined across the bottom thereof by a scored portion of the sheet, the front and rear walls being heat sealed at opposite sides thereof to define an open end for insertion of article in the pocket, the sheet being formed with one textured surface to reduce the adherence of front and back walls when the sheet is in folded condition, the sheet being folded in a manner such that open end of each pocket is spaced from the open end of every other pocket.

References Cited

UNITED STATES PATENTS

| | | | |
|---|---|---|---|
| 2,348,703 | 5/1944 | Weir et al. | 156—257 |
| 2,504,754 | 4/1950 | Sweeny | 156—272 |
| 2,510,383 | 6/1950 | Dalgleish | 156—272 |
| 2,553,054 | 5/1951 | Lincoln et al. | 156—474 |
| 2,670,026 | 2/1954 | Ungar | 156—474 |
| 2,722,038 | 11/1955 | Freund | 264—293 |
| 2,732,875 | 1/1956 | Martin | 150—39 |
| 2,767,756 | 10/1956 | Niles | 150—39 |
| 2,865,790 | 12/1958 | Baer | 156—272 |
| 2,907,365 | 10/1959 | MacDonald | 264—293 |
| 2,920,172 | 1/1960 | Stallard | 264—293 |
| 3,022,212 | 2/1962 | Butler | 156—274 |
| 3,026,233 | 3/1962 | Scholl et al. | 156—272 |
| 3,187,903 | 6/1965 | Oltz | 211—87 |
| 3,244,571 | 4/1966 | Weisman | 156—196 |

EARL M. BERGERT, *Primary Examiner.*

D. SCHWARTZ, *Assistant Examiner.*